US009879158B2

(12) United States Patent
Kubo et al.

(10) Patent No.: US 9,879,158 B2
(45) Date of Patent: Jan. 30, 2018

(54) PRIMER COMPOSITION AND ADHESIVE TAPE

(75) Inventors: Kohji Kubo, Omuta (JP); Mizuki Hasumi, Ichihara (JP)

(73) Assignee: DENKA COMPANY LIMITED, Tokyo (JP)

( * ) Notice: Subject to any disclaimer, the term of this patent is extended or adjusted under 35 U.S.C. 154(b) by 0 days.

(21) Appl. No.: 14/118,805

(22) PCT Filed: May 30, 2012

(86) PCT No.: PCT/JP2012/063842
§ 371 (c)(1),
(2), (4) Date: Nov. 19, 2013

(87) PCT Pub. No.: WO2012/165449
PCT Pub. Date: Dec. 6, 2012

(65) Prior Publication Data
US 2014/0099503 A1    Apr. 10, 2014

(30) Foreign Application Priority Data
May 31, 2011 (JP) ................................. 2011-121515

(51) Int. Cl.
| C09J 7/02 | (2006.01) |
| C09D 109/02 | (2006.01) |
| C09D 151/04 | (2006.01) |
| C09J 151/04 | (2006.01) |
| C09D 5/00 | (2006.01) |

(52) U.S. Cl.
CPC ............ *C09J 7/0257* (2013.01); *C09D 5/002* (2013.01); *C09D 109/02* (2013.01); *C09D 151/04* (2013.01); *C09J 151/04* (2013.01); *C09J 2407/00* (2013.01); *C09J 2413/003* (2013.01); *C09J 2427/006* (2013.01); *C09J 2451/003* (2013.01); *Y10T 428/2843* (2015.01)

(58) Field of Classification Search
CPC ............ C09J 2407/003; C09J 2049/003; C09J 2451/003; C09J 2413/003
See application file for complete search history.

(56) References Cited

U.S. PATENT DOCUMENTS

| 4,960,809 A * | 10/1990 | Yamaya ................ C09D 133/12 524/188 |
| 5,126,228 A * | 6/1992 | Higashi et al. ............ 430/272.1 |
| 5,571,219 A | 11/1996 | Gorton ........................... 2/161.7 |
| 2002/0061952 A1 * | 5/2002 | Kawamura .......... C09D 109/02 524/425 |
| 2002/0132966 A1 * | 9/2002 | Griffith, Jr. ............ C09J 7/0246 528/343 |
| 2008/0096029 A1 * | 4/2008 | Higuchi ................... C08J 7/047 428/447 |
| 2008/0234414 A1 * | 9/2008 | Godwin et al. ............... 524/112 |

FOREIGN PATENT DOCUMENTS

| CN | 1181390 A | 5/1998 |
| JP | 4-239080 A | 8/1992 |
| JP | 5-186745 A | 7/1993 |
| JP | 2001-302965 A | 10/2001 |
| JP | 2002-146274 A | 5/2002 |
| JP | 2006-2102 A | 1/2006 |

OTHER PUBLICATIONS

European Search Report dated Dec. 8, 2014 to the corresponding European Application No. 12792804.2.
International Search Report dated Aug. 21, 2013, issued in corresponding International Application No. PCT/JP2012/063842.
Japanese Office Action dated Oct. 6, 2015, issued to Japanese Application No. 2013-518113.
Chinese Office Action dated Feb. 4, 2016, issued by the Chinese Patent Office in corresponding application 201280026376.9.
European Office Action dated Mar. 24, 2017, issued by the European Patent Office in corresponding application EP 12 792 804.2.
"Nitrite rubber", Wikipedia, the free encyclopedia, Jan. 8, 2017 (Jan. 8, 2017), pp. 1-4, XP055356642, Retrieved from the Internet: URL: https://en.wikipedia.org/wiki/Nitrile rubber [retrieved on Mar. 20, 2017].
European Office Action dated Aug. 10, 2017, issued by the European Patent Office in corresponding Application No. EP 12 792 804.2.
D4a_Chapter 13.3.1: "Carboxylated nitrile based compounds" In: Anonymous: "Rubber Technologist's Handbook", 2001, Rapra Technology Limited, Shawbury, XP9195147, ISBN: 1-85957-262-6, pp. 454-457.

* cited by examiner

Primary Examiner — Ronak C Patel
Assistant Examiner — Thomas A Mangohig
(74) Attorney, Agent, or Firm — Stein IP, LLC

(57) ABSTRACT

An object of the invention is to provide a primer composition for application between the base film and the adhesive layer of an adhesive tape that can improve the adhesion between the base film and the adhesive layer of the adhesive tape and an adhesive tape prepared by using the primer composition. A primer composition, comprising 100 parts by mass (as solid matter) of a graft polymer of a natural rubber graft-polymerized with 15 to 65 mass % of methyl methacrylate and 25 to 300 parts by mass of a carboxyl group-modified acrylonitrile butadiene rubber.

2 Claims, No Drawings

PRIMER COMPOSITION AND ADHESIVE TAPE

CROSS-REFERENCE TO RELATED APPLICATIONS

This application is a national stage of International Application No. PCT/JP2012/063842, filed May 30, 2012, which claims the benefit of Japanese Application No. 2011-121515, filed May 30, 2011, in the Japanese Patent Office. All disclosures of the document(s) named above are incorporated herein by reference.

BACKGROUND OF THE INVENTION

1. Field of the Invention

The present invention relates to a primer composition for application between the base film and the adhesive layer of an adhesive tape and an adhesive tape prepared by using the primer composition.

2. Description of the Related Art

Known primer compositions for adhesive tapes include graft polymers obtained by graft polymerization of a natural rubber with methyl methacrylate and the blends thereof with an acrylonitrile butadiene rubber (see, for example, Patent Documents 1 and 2).

Primer compositions for application between the base film and the adhesive layer of an adhesive tape that can improve the adhesion between the base film and the adhesive layer of the adhesive tape are desired.

CITATION LIST

Patent Literatures

[Patent Document 1] Japanese Unexamined Patent Application Publication No. 2001-302965
[Patent Document 2] Japanese Unexamined Patent Application Publication No. 2002-146274

SUMMARY OF THE INVENTION

Technical Problem

An object of the present invention is to provide a primer composition for application between the base film and the adhesive layer of an adhesive tape that can improve adhesion between the base film and the adhesive layer of the adhesive tape and an adhesive tape prepared by using the primer composition.

Solution to Problem

The present invention, which was made to solve the problems above, includes the following aspects [1] to [6].

[1] A primer composition, comprising 100 parts by mass (as solid matter) of a graft polymer of a natural rubber graft-polymerized with 15 to 65 mass % of methyl methacrylate and 25 to 300 parts by mass of a carboxyl group-modified acrylonitrile butadiene rubber.

[2] The primer composition according to aspect 1, wherein the primer composition contains a graft polymer having a Mooney viscosity ($MS_{1+4}$, at 100° C.) of 70 to 160 or contains additionally 0.1 to 10 parts by mass (as solid matter) of a surfactant with respect to 100 parts by mass (as solid matter) of the graft polymer.

[3] The primer composition according to aspect 1 or 2, wherein the carboxyl group-modified acrylonitrile butadiene rubber has a carboxyl group-modification rate of 0.3 to 7 mass %.

[4] The primer composition according to any one of aspects 1 to 3, wherein the graft polymer therein is a graft polymer prepared by graft polymerization of a natural rubber with 30 to 50 mass % of methyl methacrylate.

[5] An adhesive tape, prepared by applying the primer composition according to any one of aspects 1 to 4 between a base film mainly made of a soft polyvinyl chloride and an adhesive layer mainly made of a natural rubber laminated on at least one face of the base film.

[6] The adhesive tape according to aspect 5 for electric insulation.

Advantageous Effects of Invention

The primer composition according to the present invention can improve adhesion between the base film and the adhesive layer of an adhesive tape.

DESCRIPTION OF PREFERRED EMBODIMENTS

The primer composition according to the present invention comprises a graft polymer of natural rubber graft-polymerized with methyl methacrylate at a rate of 15 to 65 mass % (hereinafter, also referred to as "graft polymer") and a carboxyl group-modified acrylonitrile butadiene rubber (hereinafter, also referred to as "modified NBR").

The graft polymer used in the primer composition according to the present invention is a natural rubber graft-polymerized with methyl methacrylate at a rate of 15 to 65 mass %. When the natural rubber is graft-polymerized with methyl methacrylate at such a particular rate, it is possible to improve favorably the adhesion between the base film and the adhesive layer of an adhesive tape, even if the modified NBR-containing primer composition is processed into a solvent-based or water-dispersion-type (emulsion-type) product (see, for example, Comparative Examples 5 to 6 and Examples 1 to 13).

The primer composition according to the present invention comprises the graft polymer and the modified NBR respectively in particular amounts, for example in amounts of 100 parts and 25 to 300 parts by mass.

Generally in an adhesive tape employing a primer composition, the primer is present as an intermediate layer between the adhesive layer and the base material layer. For separation of the adhesive from the adherend, the following relationship of force: "adhesive<contact point between adhesive and primer<primer<contact point between primer and base material<base material" should be established.

When the graft polymer and the modified NBR are contained in particular amounts as described above, the primer composition according to the present invention becomes more compatible with the base material and also with the adhesive, leading to increased adhesion between the base material and the adhesive.

As the primer composition according to the present invention has higher primer bonding force and is effective in increasing the adhesion, it is possible to obtain a favorable adhesive tape satisfying the requirements for the force relationship described above.

The modified NBR for use in the present invention is blended for improvement of the adhesion of the primer composition with the base film and the adhesive layer of the adhesive tape. It also has an action to prevent migration of the plasticizer contained in the base film into the adhesive layer.

It is because the modified NBR contains a butadiene component highly compatible with the base film, an acrylonitrile component highly compatible with the adhesive layer, and additionally carboxyl groups highly compatible both with the base film and the adhesive layer.

In addition, it is important for achieving the object of the present invention that a modified NBR is blended in the primer composition according to the present invention in an amount of 25 to 300 parts by mass with respect to 100 parts by mass of the graft polymer (as solid matter) (see, for example, Examples 4 and 6). The technical significance of the numerical range is obvious from the facts that, when the modified NBR is blended in an amount of 20 parts by mass, in particular adhesion between the base material and the primer composition and adhesiveness after immersion in water are insufficient (see Comparative Example 2) and, when the modified NBR is blended in an amount of 350 parts by mass, in particular adhesiveness between the primer composition and the adhesive and adhesion after immersion in water are insufficient (see Comparative Example 3).

Thus, the blending amount of the modified NBR in the primer composition (as solid matter) is preferably 25 to 300 parts by mass, more preferably 50 to 200 parts by mass, and still more preferably 100 to 200 parts by mass, with respect to 100 parts by mass (as solid matter) of the graft polymer. When the blending amount of the modified NBR is too low, the adhesion between the primer composition and the base film may become weaker. Alternatively when the blending amount of the modified NBR is too high, the primer composition itself may become too soft, leading to easier delamination of the adhesive tape obtained. When the blending amount of the modified NBR is in the particular numerical range above, it is possible to improve the adhesion of the primer composition both with the base film and the adhesive layer of the adhesive tape and thus to obtain an adhesive tape superior in water resistance, heat resistance, and drying resistance.

The rate of carboxyl group-modification of the carboxyl-modified acrylonitrile butadiene rubber is not particularly limited, but preferably in the range of 0.3 to 7 mass %, more preferably in the range of 0.5 to 7 mass %, as it is possible to improve the actions described above, in particular actions to increase the adhesion between the primer composition and the base film and suppress delamination of the adhesive tape by suitable hardness of the primer composition itself. It is thus possible to improve the adhesion of the base film and the adhesive layer of the adhesive tape.

The "rate of carboxyl-group modification" can be determined, for example, by NMR analysis. More specifically, it is possible to determine the rate by using the absolute value of the AN component, as determined by K—N method, and the MMA/Bd ratio, as calculated from NMR.

The carboxyl-modified acrylonitrile butadiene rubber is not particularly limited and examples thereof include low-nitrile-type butadiene rubbers (nitrile content: 24% or less), intermediate-nitrile-type butadiene rubbers (nitrile content: 25 to 30%), intermediate/high-nitrile-type butadiene rubbers (nitrile content: 31 to 35%), high-nitrile-type butadiene rubbers (nitrile content: 36 to 43%), ultrahigh-nitrile-type butadiene rubbers (nitrile content: 43% or more) and the like. Among the butadiene rubbers above, intermediate-, intermediate/high-, and high-nitrile-type butadiene rubbers are preferable, and intermediate- to high-nitrile-type butadiene rubbers having a nitrile content of about 27 to 40% are more preferable. These butadiene rubbers may be used alone or in combination of two or more. The "nitrile content" can be determined, for example, by NMR (K—N method).

The graft polymer for use in the present invention is blended for improvement of the adhesion force between the base film and the adhesive layer of the adhesive tape.

Generally, graft polymers are a kind of random block copolymers having a branched structure in which foreign branch polymer chains are bound to the backbone polymer chains.

The graft polymer according to the present invention has natural rubber (polymer) units and methyl methacrylate (monomer-polymer) units in its structure. For example, methyl methacrylate polymers are bound to the natural rubber polymers (backbone polymers) in the shape of branches (comb); natural rubber polymers are bound to the methyl methacrylate polymers (backbone polymers) in the shape of branches; or methyl methacrylate polymers are present between natural rubber polymers. The natural rubber may be fragmented and the methyl methacrylate may be monomeric.

The natural rubber units (components) are highly adhesive to the adhesive layer and the methyl methacrylate units (components) are highly adhesive to the base film. It is thus possible, by blending a graft polymer as a component for the primer composition, to increase the adhesive force between the base film and the adhesive layer of the adhesive tape.

As for the ratio of the methyl methacrylate in the graft polymer, methyl methacrylate is preferably contained in the natural rubber in an amount in the range of 15 to 70 mass %, preferably 15 to 65 mass %, and more preferably 30 to 50 mass %. The ratio of the natural rubber then is preferably 85 to 30 mass %, more preferably 70 to 50 mass %. It is possible, by not making the ratio of methyl methacrylate in the graft polymer excessively smaller, to prevent deterioration of the adhesion between the methyl methacrylate and the base film and thus to suppress delamination of the adhesive tape. It is also possible, by not making the ratio of methyl methacrylate excessively larger, to prevent excessive hardening of the primer composition itself, making it incapable to cope with deformation of the base film and thus to suppress delamination of the adhesive tape.

The graft polymer for use may be a graft polymer selected adequately from natural rubbers graft-polymerized with methyl methacrylate and such a polymer can be prepared, for example, by a known graft polymerization method such as suspension polymerization or emulsion polymerization. Alternatively, a commercial product having a methyl methacrylate content of 30 to 50% may be used.

It is possible to convert the primer composition described above into a favorable solvent-based primer composition by controlling the Mooney viscosity of the graft polymer therein.

The Mooney viscosity of the graft polymer ($MS_{1+4}$) can be reduced, for example, by kneading (mastication) the graft polymer itself by an open roll, a Banbury mixer, a kneader or the like, although the method is not particularly limited thereto.

The Mooney viscosity of the graft polymer then is preferably controlled to 70 to 160, more preferably to 80 to 150 under the condition of $MS_{1+4}$ and 100° C.

It is possible to control the delamination between the base film and the adhesive layer due to cohesive failure of the primer composition obtained by inhibiting significant drop of the Mooney viscosity of the graft polymer. It is possible, by not making the Mooney viscosity excessively higher, to make the adhesive layer incapable to cope with deformation of the base film and thus to suppress delamination of the adhesive tape.

In other words, it is possible to improve the adhesion between the base film and the adhesive layer of the adhesive tape, and obtain a favorable solvent-based primer composition that gives an adhesive tape superior in water resistance, heat resistance, and drying resistance, by controlling the Mooney viscosity of the graft polymer in the particular range above.

The Mooney viscosity can be determined according to JIS K6300. In the present invention, the test was carried out thrice and the average obtained was used.

It is also possible to convert the primer composition into a favorable emulsion-based primer composition, not by controlling the Mooney viscosity of the graft polymer but by blending the following surfactant additionally to the graft polymer and the modified NBR. The graft polymer and/or the modified NBR is desirably processed into the emulsion state before blending with the surfactant for improvement of stability.

The surfactant for use in the present invention is blended additionally to the graft polymer-containing primer composition for improvement of the wettability of the primer composition with the base film and the adhesive layer of the adhesive tape.

It is thus possible by blending a surfactant to obtain a favorable emulsion-based primer composition that enhances the adhesion between the base film and the primer composition and also between the primer composition and the adhesive layer.

The surfactant above is not particularly limited in its kind and common anionic surfactants, cationic surfactants, nonionic surfactants, various surfactants including amphoteric surfactants, polymer surfactants, fluorochemical surfactants, and reactive surfactants can be used. These surfactants can be used alone or in combination of two or more.

Among the surfactants above, anionic and nonionic surfactants are preferable, as they are not reactive in acid-base reaction with the adhesive layer.

The anionic surfactants include fatty acid-, alkylbenzene-, sulfate ester-, higher alcohol-type surfactants and typical examples thereof include higher fatty acid sodium salts, sodium alkylsulfonates, sodium alkylbenzenesulfonates, sodium alkyldiphenyletherdisulfonates, and the like.

A nonionic surfactant is preferably used among these surfactants, as it is resistant to decomposition at high temperature, for example, when the adhesive layer is dried at high temperature during production of the adhesive tape or when the adhesive tape is used in an environment at high temperature.

Typical examples of the nonionic surfactants include polyoxyethylene alkyl ethers, polyoxyethylene myristyl ethers, polyoxyethylene alkylene alkyl ethers, polyoxyethylene derivatives, polyoxyethylene polyoxypropylene block polymers, sorbitan fatty acid esters, polyoxyethylene sorbitan fatty acid esters, polyoxyethylene sorbitol fatty acid esters, glycerol fatty acid esters, polyoxyethylene fatty acid esters, polyoxyethylene oleic acid esters, polyoxyethylene alkylamines, alkylalkanolamides, polyoxyethylene nonylphenylethers, and the like.

The addition amount of the surfactant, when it is added as described above, is preferably 0.1 to 10 parts by mass, more preferably 0.5 to 5 parts by mass with respect to 100 parts by mass of the graft polymer (as solid matter).

When the addition amount of the surfactant is 0.1 part or more by mass, it is possible to prevent non-uniform coating of the adhesive layer with the primer composition because of low improvement of wettability due to the small addition amount. Alternatively when the addition amount is 10 parts or less by mass, it is possible to inhibit plasticization of the primer composition by addition thereof in a greater amount and to suppress delamination of the adhesive tape by cohesive failure of the primer composition when the adhesive tape obtained is rewound.

The primer composition according to the present invention may contain, as needed, one or more additives selected from stabilizers, softening agents, aging inhibitors, crosslinking agents, modifiers, and others. The surfactant may be added, if needed, in the range that does not impair the advantageous effects of the present invention.

The primer composition can be prepared by blending the ingredients described above, mixing and dissolving them in solvents such as water and/or an organic solvent, and adjusting the solid matter concentration and the solution viscosity adequately.

The solid matter concentration of the primer composition after dilution with water and/or an organic solvent is preferably 1 to 20 mass %, more preferably 3 to 10 mass %, from the points of coatability and coating amount.

The solution viscosity of the solution of the primer composition diluted with a solvent such as water and/or an organic solvent is preferably 1 to 500 MPa·s (BM-type viscometer, rotor NO. 1, 6 rpm), more preferably 10 to 230 MPa·s, still more preferably 10 to 100 MPa·s from the points of coatability and coating amount.

The solution viscosity is determined after the diluted solution of the primer composition was preconditioned in a constant-temperature constant-humidity chamber at a temperature of 23±2° C. and a humidity of 50±5% RH for 24 hours, as it is measured by means of a BM-type viscometer with rotor No. 1 at a revolution of 6 rpm, 1 minute after initiation of revolution. The test was carried out thrice and the average is used.

When the primer composition is diluted with an organic solvent, the solvent is, for example, toluene, hexane, n-hexane, ethyl acetate, methyl ethyl ketone, or the like. These solvents may be used alone or as a mixture of two or more.

The adhesive tape according to the present invention can be prepared by applying the primer composition described above between the base film and the adhesive layer laminated on at least one face of a base film.

The base film is not particularly limited but, for use of the primer composition above, for example, a blend of 100 parts by mass of a polyvinyl chloride having a polymerization degree of 700 to 1300, 30 to 60 parts by mass of a softening agent, and 0.1 to 5 parts by mass of a Ca—Zn-based composite stabilizer is favorably used. The base film may contain, as needed, additives such as colorants, antioxidants, ultraviolet absorbents, lubricants, fillers, and others in the range that does not impair the advantageous effects of the present invention.

The base film above can be prepared by mixing and dispersing various components uniformly in a common melt-extruder or a mixing apparatus (such as uniaxial or biaxial extruder, roll, Banbury mixer, or kneader), molding the mixture into the film shape in a calender-molding machine, and slitting it into films with a desired film width, although the molding means is not particularly limited thereto. The sequence of the rolls used during calender molding may be any known sequence, such as L-, reverse L-, or Z-type sequence, and the roll temperature is normally adjusted to a temperature in the range of 150 to 200° C., preferably in the range of 160 to 190° C. The thickness of the base film is not particularly limited, but preferably 40 to 300 μm, and more preferably 60 to 200 μm.

The adhesive for use in the adhesive layer may be any adhesive, if it is a common adhesive for adhesive tapes and, for example, solvent- and emulsion-type adhesives are usable. The adhesive may contain additionally, as needed, tackifiers, aging inhibitors, ultraviolet absorbents, crosslinking agents, softening agents and the like.

The base polymer for the adhesive is a natural rubber. The base polymer may contain, in addition to the natural rubber, one or more polymers or rubbers selected from reclaimed rubbers, silicone rubbers, isoprene rubbers, styrene butadiene rubbers, polyisoprene, NBRs (low-, intermediate-, intermediate/high-, high-, ultrahigh-type NBRs), styrene-isoprene copolymers, styrene-isoprene-butadiene copolymers, styrene-butadiene-styrene copolymers, and known graft polymers that are blended to primer compositions (see, for example, Patent Documents 1 and 2) and the like.

The tackifier is also not particularly limited and it is, for example, one or more resins selected from terpene resins, rosin resins, hydrogenated rosin resins, coumarone-indene resins, styrenic resins, petroleum resins such as aliphatic and alicyclic resins, terpene-phenol resins, xylene resins, and other aliphatic or aromatic hydrocarbon resins.

The aging inhibitor is, for example, one or two or more aging inhibitors selected from phenol-based aging inhibitors, amine-based aging inhibitors, benzimidazole-based aging inhibitors, dithiocarbamic acid salt-based aging inhibitors, phosphorus-based aging inhibitors, and the like.

The crosslinking agent is, for example, one or more crosslinking agent selected from isocyanate-, epoxy-, and amine-based resins, and the like.

The blending rates of the respective components in the adhesive are not particularly limited and, for example, a graft polymer is blended in an amount of 10 to 50 parts by mass (favorably 20 to 40 parts by mass), a tackifier in an amount of 85 to 135 parts by mass (favorably 100 to 120 parts by mass) with respect to 100 parts by mass of the natural rubber, and an aging inhibitor and an ultraviolet absorbent are blended thereto, as needed.

The solid matter concentration of the adhesive may be approximately 15 to 55%, and the viscosity of the adhesive is preferably 1 to 50000 MPa·s (BM-type viscometer, rotor No. 4, 6 rpm), more preferably 5000 to 40000 MPa·s.

Hereinafter, the process for producing an adhesive tape using the primer composition will be described.

The primer composition above is dispersed in water and/or an organic solvent after it is diluted with the solvent and the dispersion is then applied to one side of a base film mainly made of a soft polyvinyl chloride, for example, by a gravure coater, spray coater, kiss roll, bar coater, or knife coater and dried thereon. The thickness of the primer after drying can be selected arbitrarily in the range that does not impair the advantageous effects of the invention, but it is preferably 1 to 50 μm, more preferably 5 to 30 μm.

Subsequently, an adhesive is coated and dried, forming an adhesive layer, on the dried primer composition, to give an adhesive tape.

The means for coating the adhesive is not particularly limited and a common coater, such as roll coater, gravure coater, reverse roll coater, kiss roll coater, dip roll coater, bar coater, knife coater, or spray coater, may be used. The thickness of the adhesive layer after drying can be selected properly in the range that does not impair the tackiness and handling efficiency of the layer, but the thickness of the adhesive layer is, for example, 5 to 50 μm, and preferably 10 to 30 μm. Further smaller thickness may lead to deterioration of the adhesive power and the rewinding force. Further larger thickness may lead to deterioration of the coatability.

When the adhesive tape prepared is to be rewound, a release agent may be applied on the rear face of the base material or a release sheet may be laminated on the adhesive, as needed. When an adhesive is applied on the both faces of the base material as the adhesive tape, the steps for coating the primer composition and the adhesive are performed also on the rear face.

It is possible in this way to produce the adhesive tape according to the present invention. The adhesive tape according to the present invention, which contains the primer composition above, provides improved adhesion between the base film and the adhesive layer of an adhesive tape and is also superior in water resistance, heat resistance, and low-temperature resistance. Thus, the adhesive tape according to the present invention would be usable for binding of electric wires in the electric/electronic, automobile and other fields.

EXAMPLES

Hereinafter, the present invention will be described more in detail with reference to Examples, but it should be understood that the present invention is not restricted by these Examples.

The evaluation results of the adhesive tapes produced by using the primer compositions described below in Examples 1 to 13 and Comparative Examples 1 to 6 are shown in Tables 1 and 2.

The "adhesion between the base material and the primer composition" in Tables 1 and 2 shows the resistance to separation of a primer from a base film on which it is coated, as it was observed visually, when an abrasive of Bemcot M-1 (raw material: cupra) is placed on the base film having a length of 100 mm and a width of 50 mm and carrying the primer coated thereon and a weight with a load of 500 g is placed and moved thereon reciprocally once for abrasion of the primer with the abrasive.

The test was performed after the sample was preconditioned in a test chamber adjusted to a temperature of 23° C.±2° C. and a humidity of 50±5% RH, a low temperature chamber adjusted to a temperature of −5° C.±2° C., or an environmental test machine adjusted to a temperature of 50° C.±2° C. and a humidity of 80±5% RH for 24 hours. The value is the average of the values obtained in three or more tests and the primer remaining unseparated after three or more tests was considered to be satisfactory.

The "adhesiveness between the primer composition and the adhesive" in Tables 1 and 2 was determined by counting the number of the operations of bonding the adhesive faces of the adhesive tapes to each other and peeling off the adhesive tapes form each other until the adhesive thereon is separated from the primer composition. The test was performed after the adhesive tape was preconditioned for 24 hours in a test chamber controlled to a temperature of 23° C.±2° C. and a humidity of 50±5% RH, a low-temperature chamber controlled to a temperature of −5° C.±2° C., or an environment test machine controlled to a temperature of 50° C.±2° C. and a humidity of 80±5% RH. The value in the Table is the average of the values obtained in three or more tests, and the sample remaining unseparated after three or more such tests was considered to be satisfactory.

The "adhesiveness after immersion in water" in Tables 1 and 2 was evaluated by immersing a primer-laminated base film or its adhesive-laminated adhesive tape in purified water at 23° C. for 24 hours, wiping off the water remaining on the primer composition or the adhesive faces, and subjecting the sample to the tests of the "adhesion between the base material and the primer composition" and the "adhesion between the primer composition and the adhesive" after 30 seconds. The value in the Table is the average of the values obtained in three or more tests and the sample of which the primer or the adhesive remaining unseparated after the three or more tests was considered to be satisfactory.

The "tape extensibility" in Tables 1 and 2 was determined by measuring the adhesive remaining on the rear face of the base film when the adhesive tape is rewound in a tensile tester specified by JIS B7721 at a stress rate of 50 m/min. An adhesive tape in which there was no separation between the base film and the primer composition and also between the primer composition and the adhesive was considered to be satisfactory when the sample adhesive tape were rewound three or more times.

In Table 2, the material failure means that there was separation between the base film and the primer composition or between the primer composition and the adhesive, while the cohesive failure means that the adhesive layer remained unseparated on the primer composition-laminated base film and also on the rear face of the wound base film.

TABLE 1

| | | | Example | | | | | | | | | | | | |
|---|---|---|---|---|---|---|---|---|---|---|---|---|---|---|---|
| | | | 1 | 2 | 3 | 4 | 5 | 6 | 7 | 8 | 9 | 10 | 11 | 12 | 13 |
| Primer composition, composition (parts by mass) | | | | | | | | | | | | | | | |
| Graft polymer | MEGAPOLY 50 (MMA49%) | Mooney viscosity MS1 + 4 150 | 100 | 100 | 100 | 100 | 100 | 100 | 100 | | | | | | |
| | | Mooney viscosity MS1 + 4 80 | | | | | | | | | 100 | | | | |
| | MEGAPOLY 30 (MMA30%) | Mooney viscosity MS1 + 4 80 | | | | | | | | 100 | | | | | |
| | MG-40 (MMA40%) | Em | | | | | | | | | | 100 | 100 | 100 | 100 |
| | MG-67 (MMA67%) | Em | | | | | | | | | | | | | |
| | MG-10 (MMA10%) | Em | | | | | | | | | | | | | |
| Modified NBR | Nipol 1072J | AN 27 wt %, Carboxyl group 7.0 wt % | 100 | 100 | | 25 | 200 | 300 | 50 | 100 | 100 | | | | |
| | Nipol DN631 | AN 33 wt %, Carboxyl group 0.5 wt % | | | 100 | | | | 50 | | | | | | |
| | Nipol 1571 | Em AN 40 wt %, Carboxyl group 3.0 wt % | | | | | | | | | | 100 | 100 | 100 | 100 |
| | Nipol 1072 | AN 40 wt %, Carboxyl group 0.0 wt % | | | | | | | | | | | | | |
| Surfactant | PELEX SS-H | Sodium alkyl diphenyl ether disulfonate | | | | | | | | | | | 1 | 5 | 10 |
| | PELEX OT-P | Sodium alkylsulfosuccinate | | | | | | | | | | | | 1 | |
| Composition | Solid matter concentration | % | 4 | 6 | 4 | 4 | 4 | 4 | 4 | 4 | 4 | 10 | 10 | 10 | 10 |
| | Solution viscosity | MPa·s | 70 | 230 | 65 | 100 | 40 | 25 | 65 | 35 | 40 | 10 | 10 | 15 | 20 |
| Properties | | | | | | | | | | | | | | | |
| Adhesion between base material and primer composition | | Temperature 23° C. 24 HR, Humidity 50% | >10 | >10 | >10 | 5 | >10 | >10 | >10 | 6 | >10 | >10 | >10 | >10 | >10 |
| | | Temperature −5° C. 24 HR | >10 | >10 | >10 | 6 | >10 | >10 | >10 | 5 | >10 | >10 | >10 | >10 | >10 |
| | | Temperature 50° C. 24 HR, Humidity 80% | >10 | >10 | >10 | 4 | >10 | >10 | >10 | 8 | >10 | >10 | >10 | >10 | >10 |
| Adhesion between primer composition and adhesive | | Temperature 23° C. 24 HR, Humidity 50% | >10 | >10 | >10 | 6 | >10 | 5 | >10 | >10 | >10 | >10 | >10 | >10 | >10 |
| | | Temperature −5° C. 24 HR | >10 | >10 | >10 | 6 | >10 | 5 | >10 | >10 | >10 | >10 | >10 | >10 | >10 |
| | | Temperature 50° C. 24 HR, Humidity 80% | >10 | >10 | >10 | 5 | >10 | 4 | >10 | >10 | >10 | >10 | >10 | >10 | >10 |
| Adhesiveness | | Adhesion | >10 | >10 | >10 | 4 | >10 | >10 | >10 | 7 | >10 | >10 | >10 | >10 | >10 |

TABLE 1-continued

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| after immersion in water | between base material and primer composition Adhesion between primer composition and adhesive | >10 | >10 | >10 | 5 | >10 | 5 | >10 | 6 | >10 | >10 | >10 | >10 | >10 |
| Tape extensibility | Material failure or cohesive failure | No separation | No separation | No separation | No separation | No separation | No separation | No separation | No separation | No separation | No separation | No separation | No separation | No separation |

Em: emulsion, MMA: methyl methacrylate, AN: acrylonitrile

TABLE 2

| | | | Comparative Example | | | | | |
|---|---|---|---|---|---|---|---|---|
| | | | 1 | 2 | 3 | 4 | 5 | 6 |
| Primer composition, composition (parts by mass) | | | | | | | | |
| Graft polymer | MEGAPOLY 50 (MMA49%) | Mooney viscosity MS1 + 4 150 Mooney viscosity MS1 + 4 80 | 100 | 100 | 100 | 100 | | |
| | MEGAPOLY 30 (MMA30%) | Mooney viscosity MS1 + 4 80 | | | | | | |
| | MG-40 (MMA40%) | Em | | | | | | |
| | MG-67 (MMA67%) | Em | | | | | 100 | |
| | MG-10 (MMA10%) | Em | | | | | | 100 |
| Modified NBR | Nipol 1072J | AN 27 wt %, Carboxyl group 7.0 wt % | | | 20 | 350 | | |
| | Nipol DN631 | AN 33 wt %, Carboxyl group 0.5 wt % | | | | | | |
| | Nipol 1571 | Em AN 40 wt %, Carboxyl group 3.0 wt % | | | | | 100 | 100 |
| | Nipol 1072 | AN 40 wt %, Carboxyl group 0.0 wt % | | 100 | | | | |
| Surfactant | PELEX SS-H | Sodium alkyl diphenyl ether disulfonate | | | | | 1 | 1 |
| | PELEX OT-P | Sodium alkylsulfosuccinate | | | | | | |
| Composition | Solid matter concentration | % | 4 | 4 | 4 | 4 | 10 | 10 |
| | Solution viscosity | MPa · s | 550 | 90 | 150 | 20 | 20 | 7 |
| Properties | | | | | | | | |
| Adhesion between base material and primer composition | | Temperature 23° C. 24 HR, Humidity 50% | 2 | 8 | 1 | >10 | >10 | <1 |
| | | Temperature −5° C. 24 HR | 1 | 7 | 2 | >10 | >10 | <1 |
| | | Temperature 50° C. 24 HR, Humidity 80% | 2 | 6 | 1 | >10 | >10 | <1 |
| Adhesion between primer composition and adhesive | | Temperature 23° C. 24 HR, Humidity 50% | 2 | 1 | >10 | 1 | 1 | 7 |
| | | Temperature −5° C. 24 HR | 1 | 2 | >10 | 2 | >1 | 8 |
| | | Temperature 50° C. 24 HR, Humidity 80% | 1 | <1 | >10 | 1 | >1 | 6 |
| Adhesiveness after immersion in water | | Adhesion between base material and primer composition | 1 | 6 | 1 | >10 | >10 | <1 |
| | | Adhesion between primer composition and adhesive | 1 | <1 | >10 | 1 | >1 | 5 |
| Tape extensibility | | Material failure or cohesive failure | Material failure | Material failure | No separation | Material failure | Material failure | Material failure |

Em: emulsion, MMA: methyl methacrylate, AN: acrylonitrile

Example 1

(a) A base film was prepared by mixing 100 parts by mass of a polyvinyl chloride having a polymerization degree of 1000, 45 parts by mass of a softening agent, 1.5 parts by mass of a Ca—Zn-based composite stabilizer, a colorant, an ultraviolet absorbent, a lubricant, and a filler in a Banbury mixer to give a uniform dispersion of respective components, and molding the mixture in a L-shaped calender-molding machine into a film-shaped article having a thickness of 150 μm.

(b) A primer composition was prepared by mixing and dissolving 100 parts by mass of a graft polymer "MEGA-POLY 50 produced by GREEN HPSP (Mooney viscosity: 150, methyl methacrylate content: 49 mass %)" and 100 parts by mass of a modified NBR "Nipol 1072J (carboxyl-modification rate: 7.0 mass %) produced by Zeon Corporation" in toluene. The solution was adjusted to a solid matter concentration of 4% and a solution viscosity of 40 MPa·s. The primer composition obtained was coated on one face of the base film with a gravure coater to a thickness of 0.7 μm after drying and dried thereon, to give a laminate.

(c) An adhesive was prepared by mixing and dissolving 100 parts by mass of a natural rubber (Mooney viscosity: 45), 20 parts by mass of a graft polymer of 70 mass % of a natural rubber graft copolymerized with 30 mass % of methyl methacrylate "MEGAPOLY 30 produced by GREEN HPSP (Mooney viscosity: 80, methyl methacrylate content: 30 mass %)," 100 parts by mass of a tackifier "YS resin PX-1000 produced by Yasuhara Chemical," and 2 parts by mass of an aging inhibitor "Antage W-500 produced by Kawaguchi Chemical Industry Co., Ltd." in toluene. The solution was adjusted to a solid matter concentration of 35% and a viscosity of 30000 MPa·s. The adhesive obtained was coated on the primer composition with a roll coater to a thickness of 20 μm after drying and dried thereon, to give an adhesive tape.

Other adhesive tapes in the Examples and Comparative Examples below were prepared similarly to the adhesive tape in the present Example.

Example 2

In Example 2, a primer composition having a solid matter concentration of 6% and a solution viscosity of 230 MPa·s, which was prepared by modifying the amount of toluene used in the primer composition of Example 1, was used.

Example 3

In Example 3, a primer composition having a solid matter concentration of 4% and a solution viscosity of 65 MPa·s, which was prepared by mixing and dissolving the ingredients above, while a component used in the primer composition of Example 1, i.e., the modified NBR "Nipol 1072J produced by Zeon Corporation (carboxyl-modification rate: 7.0 mass %)," was replaced with "Nipol DN631 produced by Zeon Corporation (carboxyl-modification rate: 0.5 mass %)," was used.

Example 4

In Example 4, a primer composition having a solid matter concentration of 4% and a solution viscosity of 100 MPa·s, which was prepared by mixing and dissolving the ingredients above in toluene, while the blending amount of the modified NBR, a component of the primer composition of Example 1, was changed from "100 parts by mass" to "25 parts by mass," was used.

Example 5

In Example 5, a primer composition having a solid matter concentration of 4% and a solution viscosity of 40 MPa·s, which was prepared by mixing and dissolving the ingredients above in toluene, while the blending amount of the modified NBR, a component of the primer composition of Example 1, was changed from "100 parts by mass" to "200 parts by mass," was used.

Example 6

In Example 6, a primer composition having a solid matter concentration of 4% and a solution viscosity of 25 MPa·s, which was prepared by mixing and dissolving the ingredients above in toluene, while the blending amount of the modified NBR, a component of the primer composition of Example 1, was changed from "100 parts by mass" to "300 parts by mass," was used.

Example 7

In Example 7, a primer composition having a solid matter concentration of 4% and a solution viscosity of 65 MPa·s, which was prepared by mixing and dissolving the ingredients above in toluene, while the modified NBR, a component of the primer composition of Example 1, was replaced with the mixture of 50 parts by mass of the modified NBR used in Example 1 [Nipol 1072J produced by Zeon Corporation (carboxyl-modification rate 7.0: mass %)] and 50 parts by mass of the modified NBR used in Example 3 [DN631 produced by Zeon Corporation (carboxyl-modification rate: 0.5 mass %)]," was used.

Example 8

In Example 8, a primer composition having a solid matter concentration of 4% and a solution viscosity of 35 MPa·s, which was prepared by mixing and dissolving the ingredients above in toluene, while the graft polymer "MEGA-POLY 50 produced by GREEN HPSP (Mooney viscosity 150, methyl methacrylate content: 49 mass %)," a component of the primer composition of Example 1, was replaced with "MEGAPOLY 30 produced by GREEN HPSP (Mooney viscosity: 80, methyl methacrylate content: 30 mass %)," was used.

Example 9

In Example 9, a primer composition having a solid matter concentration of 4% and a solution viscosity of 40 MPa·s, which was prepared by mixing and dissolving the ingredients above in toluene, while the Mooney viscosity of the graft polymer [MEGAPOLY 50 produced by GREEN HPSP (Mooney viscosity 150, methyl methacrylate content: 49 mass %)], a component of the primer composition of Example 1, was adjusted to "80" by mastication, was used.

Example 10

In Example 10, used was a primer composition having a solid matter concentration of 10% and a solution viscosity of 10 MPa·s, which was prepared, as 100 parts by mass of the graft polymer "MEGAPOLY 50 produced by GREEN HPSP (Mooney viscosity: 150, methyl methacrylate content: 49 mass %)" and 100 parts by mass of the modified NBR "Nipol 1072J produced by Zeon Corporation (carboxyl-modification rate: 7.0 mass %)" in the primer composition used in Example 1 were replaced with 100 parts by mass of a graft polymer "MG-40 produced by Regitex (methyl methacrylate content: 40 mass %)" and 100 parts by mass of a modified NBR "Nipol 1571 produced by Zeon Corporation (carboxyl-modification rate: 3.0 mass %);" 1 part by mass of a surfactant "PELEX SS-H produced by Kao Corporation (sodium alkyl diphenyl ether disulfonate)" was added to the graft polymer and the modified NBR; and the resulting solution was mixed and diluted with water.

Example 11

In Example 11, used was a primer composition having a solid matter concentration of 10% and a solution viscosity of 10 MPa·s, which was prepared by dissolving the ingredients above in toluene, as 1 part by mass of the surfactant used in the primer composition of Example 10, i.e., "PELEX SS-H produced by Kao Corporation (sodium alkyl diphenyl ether disulfonate)" was replaced with 1 part by mass of "sodium alkylsulfosuccinate produced by Kao Corporation," and the solution was mixed and diluted with water.

Example 12

In Example 12, used was a primer composition having a solid matter concentration of 10% and a solution viscosity of 15 MPa·s, which was prepared by dissolving the ingredients above in toluene, while the blending amount of the surfactant, a component of the primer composition of Example 10, was changed from "1 part by mass" to "5 parts by mass" and the solution was mixed and diluted with water.

Example 13

In Example 13, used was a primer composition having a solid matter concentration of 10% and a solution viscosity of 20 MPa·s, which was prepared by dissolving the ingredients above in toluene, while the blending amount of the surfactant, a component of the primer composition of Example 10, was changed from "1 part by mass" to "10 parts by mass" and the solution was mixed and diluted with water.

Results of Examples 1 to 13

As shown in Table 1, desired primer compositions and adhesive tapes that were favorable in all properties were obtained.

Comparative Example 1

In Comparative Example 1, used was a primer composition having a solid matter concentration of 4% and a solution viscosity of 550 MPa·s, which was prepared by mixing and dissolving the ingredients above in toluene without addition of the modified NBR to the primer composition. The adhesive tape of Comparative Example 1 was found to be unfavorable in the "adhesion between the base material and the primer composition," the "adhesion between the primer composition and the adhesive," the "adhesiveness after immersion in water," and the "tape extensibility."

Comparative Example 2

In Comparative Example 2, used was a primer composition having a solid matter concentration of 4% and a solution viscosity of 90 MPa·s, which was prepared by mixing and dissolving the ingredients above in toluene, while the modified NBR, a component of the primer composition of Example 1, was replaced with "NBR Nipol 1072 produced by Zeon Corporation (carboxyl-modification rate: 0.0 mass %)," was used. The adhesive tape of Comparative Example 2 was found to be unfavorable in the "adhesion between the primer composition and the adhesive," the "adhesiveness after immersion in water," and the "tape extensibility."

Comparative Example 3

In Comparative Example 3, used was a primer composition having a solid matter concentration of 4% and a solution viscosity of 150 MPa·s, which was prepared by mixing and dissolving the ingredients above in toluene, while the blending amount of the modified NBR, a component of the primer composition of Example 1, was changed from "25 parts by mass" to "20 parts by mass." The adhesive tape of Comparative Example 3 was found to be unfavorable in the "adhesion between the base material and the primer composition," the "adhesiveness after immersion in water," and the "tape extensibility."

Comparative Example 4

In Comparative Example 4, used was a primer composition having a solid matter concentration of 4% and a solution viscosity of 20 MPa·s, which was prepared by mixing and dissolving the ingredients above in toluene, while the blending amount of the modified NBR, a component of the primer composition of Example 1, was changed from "25 parts by mass" to "350 parts by mass." The adhesive tape of Comparative Example 4 was found to be unfavorable in the "adhesion between the primer composition and the adhesive," the "adhesiveness after immersion in water," and the "tape extensibility."

Comparative Example 5

In Comparative Example 5, used was a primer composition having a solid matter concentration of 10% and a solution viscosity of 20 MPa·s, which was prepared by dissolving the ingredients above in toluene, while a component of the primer composition used in Example 10, i.e., the graft polymer "MEGAPOLY 50 produced by GREEN HPSP (Mooney viscosity: 150, methyl methacrylate content: 49 mass %)" was replaced with 100 parts by mass of "MG-67 produced by Regitex (methyl methacrylate content: 67 mass %)," and the solution was mixed and diluted with water. The adhesive tape of Comparative Example 5 was found to be unfavorable in the "adhesion between the primer composition and the adhesive," the "adhesiveness after immersion in water," and the "tape extensibility."

Comparative Example 6

In Comparative Example 6, used was a primer composition having a solid matter concentration of 10% and a solution viscosity of 20 MPa·s, which was prepared by dissolving the ingredients above in toluene, while a component of the primer composition used in Example 10, i.e., the graft polymer "MEGAPOLY 50 produced by GREEN HPSP (Mooney viscosity 150, methyl methacrylate content 49 mass %)" was replaced with 100 parts by mass of "MG-10 produced by Regitex (methyl methacrylate content: 10 mass %)," and the solution was mixed and diluted with water. The adhesive tape of Comparative Example 6 was found to be unfavorable in the "adhesion between the base material and the primer composition," the "adhesiveness after immersion in water", and the "tape extensibility."

INDUSTRIAL APPLICABILITY

It is possible by using the tape according to the present invention to improve adhesion between the base film and the adhesive layer of the adhesive tape, obtain an adhesive tape superior in water resistance, heat resistance, and low-temperature resistance, and use it for binding of electric wires in the electric/electronic field and also in the automobile field.

The invention claimed is:

1. An adhesive tape, prepared by applying a primer composition between a base film mainly made of a polyvinyl chloride having 30 to 60 parts by mass of a softening agent and an adhesive layer mainly made of a natural rubber and a graft polymer of 70 mass % of a natural rubber graft copolymerized with 30 mass % of methyl methacrylate laminated on at least one face of the base film; and
   wherein the primer composition,
      comprising 100 parts by mass (as solid matter) of a graft polymer of a natural rubber graft-polymerized with 30 to 50 mass % of methyl methacrylate and 100 to 200 parts by mass of a carboxyl group-modified acrylonitrile butadiene rubber; and
   the carboxyl group-modified acrylonitrile butadiene rubber has a nitrile content of 27 to 40% and carboxyl group-modification rate of 0.5 to 7 mass %, and
   a solid matter concentration of the primer composition after dilution with solvent is 1 to 20 mass %, and
   a solution viscosity of the solution of the primer composition diluted with a solvent is 1 to 500 MPa·s, and
   the primer composition contains a graft polymer having a Mooney viscosity ($MS_{1+4}$, at 100.degree. C.) of 80 to 150 or contains additionally 1 to 10 parts by mass (as solid matter) of a surfactant with respect to 100 parts by mass (as solid matter) of the graft polymer.

2. The adhesive tape according to claim 1, wherein the tape is used for binding of electric wires.

* * * * *